US011555982B1

(12) United States Patent
McKinnon (10) Patent No.: US 11,555,982 B1
(45) Date of Patent: Jan. 17, 2023

(54) DETECTING POSITIONAL DEVIATIONS IN AN OPTICAL MODULE

(71) Applicant: Apple Inc., Cupertino, CA (US)

(72) Inventor: Neil McKinnon, San Jose, CA (US)

(73) Assignee: APPLE INC., Cupertino, CA (US)

( * ) Notice: Subject to any disclaimer, the term of this patent is extended or adjusted under 35 U.S.C. 154(b) by 152 days.

(21) Appl. No.: 17/121,792

(22) Filed: Dec. 15, 2020

(51) Int. Cl.
  G02B 7/09 (2021.01)
  G02F 1/29 (2006.01)
  G02B 27/00 (2006.01)
  H04N 13/254 (2018.01)

(52) U.S. Cl.
  CPC .......... *G02B 7/09* (2013.01); *G02B 27/0025* (2013.01); *H04N 13/254* (2018.05)

(58) Field of Classification Search
  CPC .... G02B 7/02; G02B 7/04; G02B 7/09; G02F 2001/294
  See application file for complete search history.

(56) References Cited

U.S. PATENT DOCUMENTS

| | | | |
|---|---|---|---|
| 6,950,454 B2 | 9/2005 | Kruschwitz et al. | |
| 6,975,784 B1 | 12/2005 | Xu et al. | |
| 7,734,161 B2 | 6/2010 | Brosnan et al. | |
| 2002/0012114 A1 | 1/2002 | Shirai et al. | |
| 2002/0176713 A1 | 11/2002 | Kai et al. | |
| 2004/0008744 A1 | 1/2004 | Okazaki et al. | |
| 2008/0284838 A1 | 11/2008 | Suzuki et al. | |
| 2008/0291318 A1 | 11/2008 | Artonne et al. | |
| 2010/0002735 A1 | 1/2010 | Egawa | |
| 2010/0322551 A1 | 12/2010 | Budd et al. | |
| 2012/0111495 A1 | 5/2012 | Shimoi et al. | |
| 2013/0163627 A1 | 6/2013 | Seurin et al. | |
| 2013/0234029 A1 | 9/2013 | Bikumandla | |
| 2016/0178805 A1 | 6/2016 | Kang et al. | |
| 2017/0324905 A1 | 11/2017 | Yu | |
| 2018/0103208 A1 | 4/2018 | Jung et al. | |
| 2018/0173079 A1 | 6/2018 | Wakamatsu | |

(Continued)

FOREIGN PATENT DOCUMENTS

CN 108291854 A 7/2018

OTHER PUBLICATIONS

U.S. Appl. No. 16/554,647 Office Action dated Jan. 12, 2021.
(Continued)

*Primary Examiner* — Jack Dinh
(74) *Attorney, Agent, or Firm* — Kligler & Associates Patent Attorneys Ltd (57) ABSTRACT

Optoelectronic apparatus includes a projector, which includes an emitter array, including emitters configured to emit respective beams of optical radiation, and projection optics having an entrance face and an exit face and configured to receive the beams of the optical radiation through the entrance face and to project the beams through the exit face. An optical window is positioned adjacent to the exit face and is configured to transmit the optical radiation emitted by the emitter array toward a scene. A detector array includes multiple optical detector elements, which are configured to detect a part of the optical radiation that is reflected back into the apparatus by the optical window. A controller is coupled to monitor a spatial distribution of the optical radiation reflected by the optical window and sensed by the detector array, so as to detect and adjust for a positional deviation of the projector.

16 Claims, 4 Drawing Sheets

(56) References Cited

U.S. PATENT DOCUMENTS

2019/0036297 A1     1/2019   Gloor et al.
2019/0155007 A1     5/2019   Steever et al.

OTHER PUBLICATIONS

CN Application # 201910839606.7 Office Action dated Oct. 11, 2021.
U.S. Appl. No. 16/292,367 Office Action dated Sep. 16, 2022.
U.S. Appl. No. 16/292,367 Office Action dated Nov. 14, 2022.

Fig. 1

DETECTING POSITIONAL DEVIATIONS IN AN OPTICAL MODULE

CROSS-REFERENCE TO RELATED APPLICATION

This application is a continuation of U.S. patent application Ser. No. 16/180,048, filed Nov. 5, 2018, which claims the benefit of U.S. Provisional Patent Application 62/588,358, filed Nov. 19, 2017, which is incorporated herein by reference.

FIELD OF THE INVENTION

The present invention relates generally to optoelectronic systems, and particularly to monitoring focus of an optoelectronic projection system.

BACKGROUND

Optical modules are very commonly used in consumer electronic devices. For example, almost all current portable telephones and computers include a miniature camera module. Miniature optical projection modules are also expected to come into increasing use in portable consumer devices for a variety of purposes.

Such projection modules may be used, for example, to cast a pattern of structured light onto an object for purposes of three-dimensional (3D) mapping (also known as depth mapping). In one example the projection module comprises an array of light emitters and projection optics, wherein the array is positioned at the focal plane of the projection optics. Beams of light emitted by the array are projected by the projection optics so as to form a pattern of illuminated spots on the object. (The terms "optical radiation" and "light" as used in the present description and in the claims refer generally to any and all of visible, infrared, and ultraviolet radiation.) An image capture assembly captures an image of the pattern that is projected onto the object, and a processor processes the image so as to a 3D map of the object. The method of spot projection is also applicable to 3D mapping utilizing a time-of-flight method, wherein the emitters, such as VCSELs (Vertical Cavity Surface Emitting Lasers), are pulsed, and the image capture assembly comprises high-speed detectors, such as SPADs (Single-photon Avalanche Diodes).

As another example, U.S. Pat. No. 9,091,413 describes photonics modules that include optoelectronic components and optical elements (refractive and/or patterned) in a single integrated package. According to the inventors, these modules can be produced in large quantities at low cost, while offering good optical quality and high reliability. They are useful as projectors of patterned light, for example in 3D mapping applications as described above, but they may also be used in various other applications that use optical projection and sensing, including free-space optical communications.

SUMMARY

Embodiments of the present invention that are described hereinbelow provide improved apparatus and methods for optical projection.

There is therefore provided, in accordance with an embodiment of the present invention, optoelectronic apparatus, which includes a projector, including an array of first emitters, which are configured to emit respective first beams of optical radiation at a first wavelength, and a second emitter, which is configured to emit a second beam of optical radiation at a second wavelength. An optical sensor is positioned in proximity to the first and second emitters. Projection optics having an entrance face and an exit face are configured to receive the first and second beams of the optical radiation through the entrance face and to project the beams through the exit face. An optical window is configured to transmit the optical radiation at the first wavelength and to reflect the optical radiation at the second wavelength, and is positioned adjacent to the exit face of the projection optics so as to reflect the second beam back through the projection optics toward the optical sensor. An actuator is configured to adjust a focal setting of the projection optics. A controller is coupled to the optical sensor and to the actuator, and which is configured to drive the actuator responsively to a distribution of the optical radiation received and sensed by the optical sensor.

In a disclosed embodiment, the apparatus includes a semiconductor substrate, wherein the array of first emitters, the second emitter, and the optical sensor are disposed on the semiconductor substrate.

In one embodiment, the controller is configured to monitor a spatial extent of the distribution of the optical radiation received and sensed by the optical sensor, and to drive the actuator so as to minimize the spatial extent.

Additionally or alternatively, the optical sensor includes a detector array including multiple optical detector elements. In one embodiment, the apparatus includes an astigmatic optical element in an optical path of the second beam, and the controller is configured to drive the actuator so as to drive the distribution of the optical radiation received and sensed by the detector array to a predetermined shape.

In one embodiment, the actuator is configured to adjust a distance between the projection optics and the array of first emitters. Alternatively or additionally, the projection optics include at least one optical element with an adjustable focal length, and the actuator is configured to adjust the focal length of the at least one optical element.

In another embodiment, the optical window is oriented at an angle not normal to an optical axis of the projection optics.

Additionally or alternatively, the apparatus includes a filter positioned in proximity to the optical sensor and configured to prevent the optical radiation at the first wavelength from impinging on the optical sensor.

There is also provided, in accordance with an embodiment of the invention, a method for projection, which includes projecting first beams of optical radiation at a first wavelength from an array of first emitters using projection optics, which receive the first beams of the optical radiation through the entrance face and project the beams through the exit face. A second beam of optical radiation at a second wavelength is directed through the projection optics. An optical window, which is configured to transmit the optical radiation at the first wavelength and to reflect the optical radiation at the second wavelength, is positioned adjacent to the exit face of the projection optics so as to reflect the second beam back through the projection optics toward an optical sensor positioned in proximity to the first and second emitters. A focal setting of the projection optics is adjusted responsively to a distribution of the optical radiation received and sensed by the optical sensor.

The present invention will be more fully understood from the following detailed description of the embodiments thereof, taken together with the drawings in which:

DETAILED DESCRIPTION OF EMBODIMENTS

Mass production of miniaturized optical devices calls for product designs that meet the often-conflicting objectives of high precision and reliability and low manufacturing cost. For example, a miniature projection module may be configured to project a structured light pattern, and images of the pattern captured by a camera module may then be processed for purposes of depth mapping. For accurate depth mapping, it is important that the contrast and geometry of the pattern be consistent and well controlled. For 3D mapping utilizing the time-of-flight method, accurate operation requires well-defined pulsed spots of light, which concentrate the pulse energy in the desired locations on the object.

At the same time, consumer devices are expected to function in a wide range of different temperatures and environmental conditions. Temperature variations cause components of the optical modules to expand or contract, and possibly to change their refractive index, leading to changes in focal properties. Thermal swings can particularly change the focal length of the projection optics in a structured light projection module, causing the spots projected on the object to expand and eventually to overlap, thus degrading the parallax-based depth sensing capability of the module. For depth sensing based on time-of-flight, the expansion of the projected spots degrades the strength of the received signal, thus lowering the signal-to-noise ratio. This problem is particularly acute when the optical components of the module include refractive elements made from molded plastic (dictated by the need for mass production at low cost), because such elements are particularly prone to thermal expansion and contraction, as well as to changes of the refractive index as a function of temperature.

Methods used for focus control of conventional imaging systems, such as methods based on image contrast or phase-sensitive pixels, cannot readily be applied to the optics of structured illumination projectors. In order to maintain focus, complex and costly passive athermalization techniques may be employed, but they may not suffice to bring the focal length to within required tolerances.

Embodiments of the present invention that are described herein address these problems by incorporating into the optoelectronic projector module a focus detector and a focusing actuator controlled by the focus detector.

In the disclosed embodiments, the projector module comprises projection optics and an array of first emitters, such as VCSELs or other sorts of laser diodes, positioned at the focal plane of the projection optics. First beams of light emitted by the first emitters at a first wavelength $\lambda_1$ are received by the projection optics through an entrance face and are projected through an exit face of the optics, for example to project a desired pattern.

The focus detector comprises a second emitter, which emits a second beam of light at a second wavelength $\lambda_2$, wherein $\lambda_2$ differs from $\lambda_1$, and which is positioned at the focal plane of the projection optics so that the second beam of light is also projected by the projection optics. For example, $\lambda_1$ may be 940 nm, and $\lambda_2$ may be 900 nm or 980 nm. The focus detector also comprises an optical sensor in proximity to the array of first emitters and the second emitter. The focus detector further comprises an optical window, which, by utilizing one or more multilayer thin-film coatings deposited on the window, transmits light at $\lambda_1$ and reflects light at $\lambda_2$. The window is positioned adjacent to the exit face of the projection optics, typically at an angle normal to the optical axis of the projection optics, so as to transmit the first beams of light towards an object and to reflect the second beam of light back through the projection optics toward the optical sensor. The window may alternatively be tilted with respect to the optical axis of the projection optics in order to increase the distance between the array of the first emitters and the optical sensor.

The distance to which the waists of the first beams are projected is determined by the position of the array of first emitters with respect to the rear focal plane of the projection optics. In an embodiment of the present invention, the array is positioned at the focal plane, and the laser beam waists are projected to a far distance, such as tens or hundreds of meters, for example, and the projection optics are said to work at infinite conjugates. In an alternative embodiment, the array of first emitters is positioned at an offset from the focal plane so as to project the laser beam waists to a finite distance from the projector, for example to a distance of 0.5 m, and the projection optics are said to work at finite conjugates.

In the embodiment in which the projection optics work at infinite conjugates, both the first beams and the second beam are projected by the projection optics to a distance which is very large as compared to a typical focal length of the projection optics, for example a focal length of 5-10 mm. The second beam is reflected by the window back to the projection optics and, since the beam is received by the projection optics as if it were arriving from a very large distance, it is focused onto the sensor at the focal plane of the optics.

In an alternative embodiment, in which the projection optics work at finite conjugates, both the first beams and the second beam are projected to a finite distance from the projection optics. Consequently, the retro-reflected second beam is defocused at the sensor.

In a further embodiment of the present invention, the module comprises an astigmatic optical element in the optical path of the second beam. This element causes the focal spot on the sensor to be an astigmatic spot, with a generally elliptical shape. The astigmatic optical element may be used both for infinite and finite conjugates.

A controller, coupled to the sensor and to the actuator, monitors the light distribution on the sensor and drives the actuator in response to the distribution in order to maintain an optimal focus.

In an embodiment of the present invention, the projector module comprises a semiconductor substrate, such as a silicon (Si) substrate. The array of first emitters, the second emitter and the sensor are formed on the semiconductor substrate using methods that are known in the art in semiconductor fabrication. For example, the emitters may comprise multiple epitaxial layers of III-VI semiconductor materials.

Temperature fluctuations may change the refractive index, as well as the dimensions, of the lenses of the projection optics, and thus change their focal lengths. This, in turn, will cause the projector module to drift from its optimal operating point, so that the first beams are no longer projected to their intended, optimal distance. The focal drift reduces the quality of the pattern of spots of the first beams that is projected onto a scene. At the same time, the shape and/or size of the focal spot of the second beam returning through the projection optics onto the sensor is changed. The controller will have stored the distribution of the focal spot at the optimal operating point. The controller monitors the focal spot, and when it senses a deviation of the shape and/or size of the focal spot from the optimal distribution, it sends a feedback signal to the focus actuator to bring the focal spot back to the optimal distribution. This corrects for the drift in the focal length of the projection optics, and returns the first beams to their intended projection distance.

In an embodiment of the present invention, the sensor comprises an array of detectors and the controller monitors the distribution of light on the detectors of the array.

In an embodiment of the present invention, the focusing actuator operates by changing the distance between the projection optics and the emitter array.

In another embodiment of the present invention, the projection optics comprise at least one lens element with an adjustable focal length, and the focusing actuator operates by adjusting this focal length.

Figure 1:
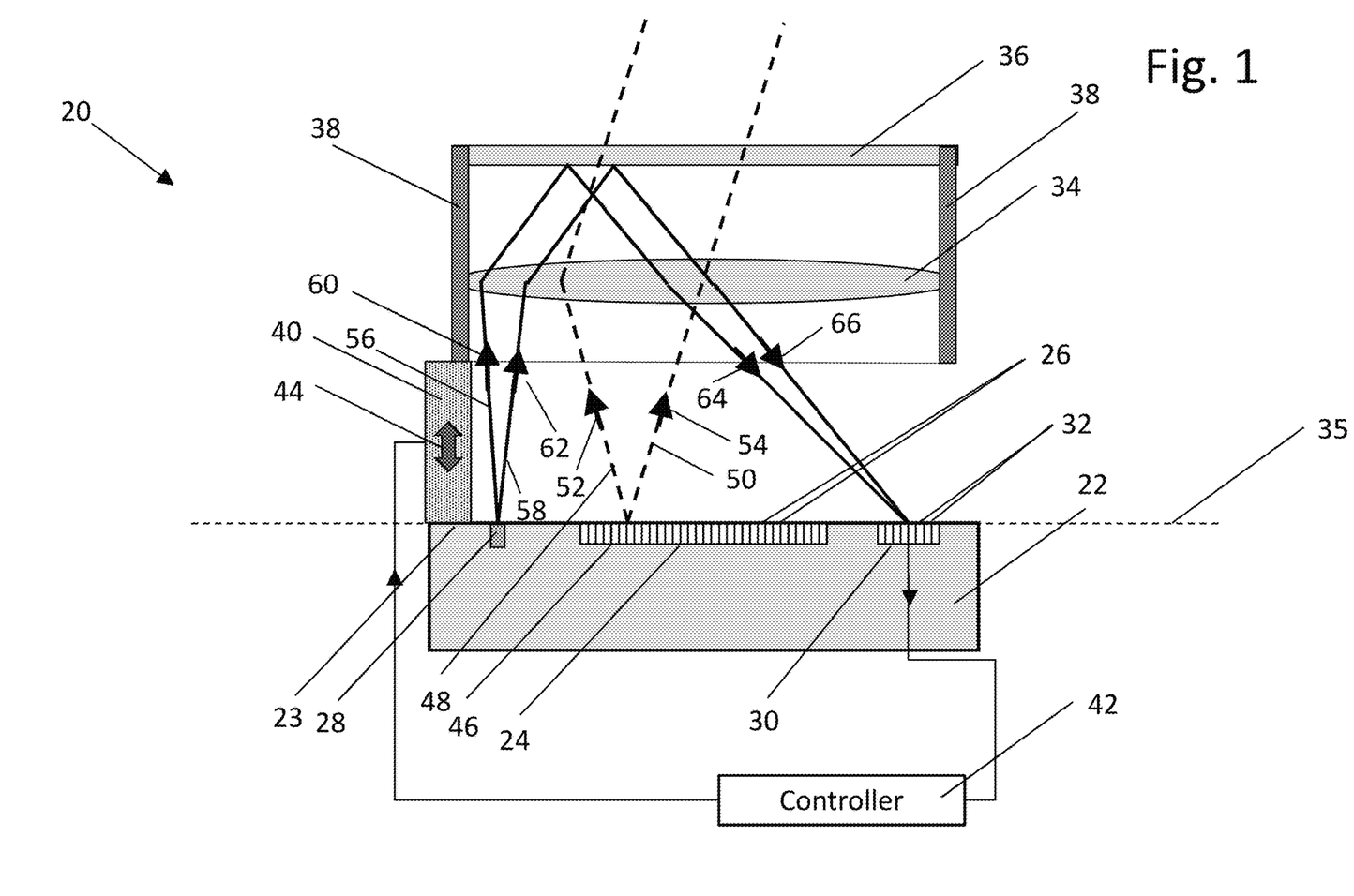
FIG. 1 is a schematic sectional illustration of an optoelectronic apparatus, in accordance with an embodiment of the invention.
Figure 2:
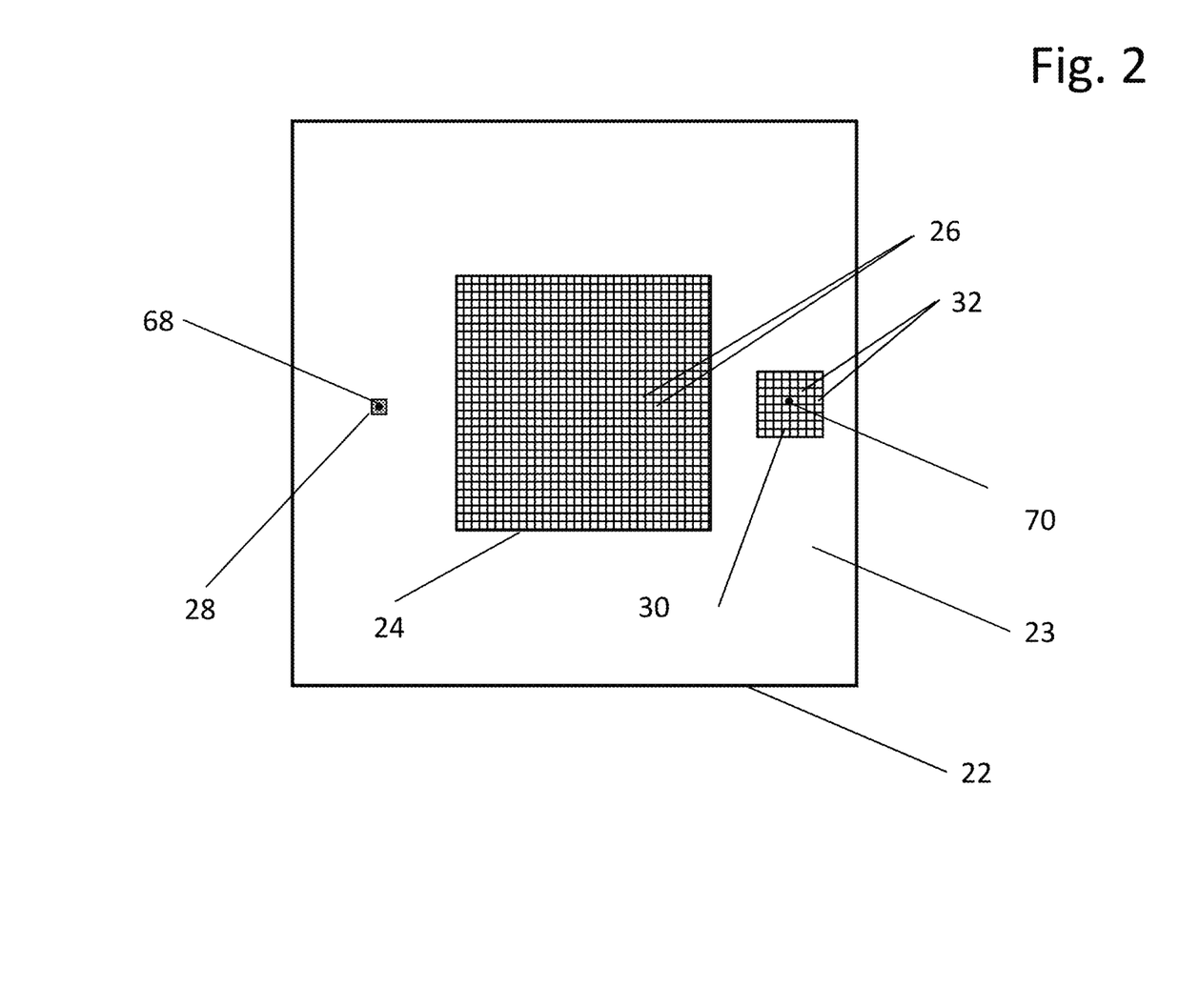
FIG. 2 is a schematic top view of a substrate on which emitter and detector arrays are formed, in accordance with an embodiment of the invention.

FIG. 1 is a schematic sectional illustration of an optoelectronic apparatus 20, in accordance with an embodiment of the invention. Optoelectronic apparatus 20 comprises a semiconductor substrate 22, such as a Si-wafer substrate, with a top surface 23 on which an emitter array 24 comprising first emitters 26, a second emitter 28, and a sensor comprising, in this example, a detector array 30, which comprises an array of detector elements 32, are formed. Although emitter array 24 and detector array 30 appear in the sectional illustration as one-dimensional arrays, they typically comprise two-dimensional arrays, as is illustrated in FIG. 2. In alternative embodiments, however, other types of sensors (not necessarily arrays) may be used, and the principles of the present invention may similarly be applied in maintaining the focus of a single projected beam, rather than an entire array.

Optoelectronic apparatus 20 further comprises projection optics 34, with a rear focal plane 35, and an exit optical window 36. In the illustration, projection optics 34 are shown, for the sake of simplicity, as a single lens, but optics 34 may alternatively comprise multiple lenses. Projection optics 34 and window 36 are attached to a mechanical frame 38. An actuator 40 attached between substrate 22 and mechanical frame 38, comprises, for example, a motor, transducers, or other electromechanical element capable of adjusting the distance between projection optics 34 and the substrate. A controller 42, coupled to detector array 30 and to actuator 40, drives the actuator in response to the distribution of the optical radiation received and sensed by the detector array, as indicated by an arrow 44, in order to increase or to decrease the distance between projection optics 34 and substrate 22 and thus maintain optimal focus of the projected beams.

In some embodiments, controller 42 comprises a programmable controller, which is programmed in software and/or firmware to carry out the functions that are described herein. Additionally or alternatively, at least some of the functions of controller 42 may be carried out by hardware logic circuits, which may be hard-wired or programmable. In either case, controller has suitable interfaces for receiving and transmitting data and instructions to and from other elements of apparatus 20 as described.

First emitters 26 and second emitter 28 comprise lasers, such as laser diodes or VCSELs. Lasers formed from III-VI group of materials may be integrated on substrate 22 using semiconductor processing methods known to those skilled in the art. First emitters 26 emit respective first beams of light at wavelength $\lambda_1$, while second emitter 28 emits a second beam of light at a wavelength $\lambda_2$, wherein $\lambda_2$ differs from $\lambda_1$. In an embodiment of the present invention, $\lambda_1$ is 940 nm and $\lambda_2$ is either 900 nm or 980 nm. Alternatively, other emitters 26 and 28 may operate at other values of $\lambda_1$ and $\lambda_2$. In all cases, window 36 is coated, for example with one or more multilayer thin-film coatings, as is known in the art, to transmit light at wavelength $\lambda_1$ and to reflect light at wavelength $\lambda_2$. Optionally, an optical filter 47 may be placed above the array of detector elements 32 to block stray light from the first beams from impinging on the array and thus interfering with the light from the retro-reflected second beam, which is focused onto the array. Optical filter 47 is configured to reflect or absorb light at wavelength $\lambda_1$ (i.e., to prevent wavelength $\lambda_1$ from reaching the detector) and to transmit light at wavelength $\lambda_2$, and can be fabricated using, for example, similar sorts of multilayer thin-film coatings as are used for window 36.

Electronic components, such as laser drivers, may also be integrated on substrate 22.

FIG. 1 illustrates paths for selected optical rays, in accordance with an embodiment of the invention. In the illustrated embodiment, substrate 22 is positioned so that its top surface 23 exactly coincides with focal plane 35 of projection optics 34.

In order to illustrate the functioning of optoelectronic apparatus 20, one of first emitters 26 is labeled as a first emitter 46. First emitter 46 emits a first beam of light at wavelength $\lambda_1$, with the beam and its direction of propagation illustrated schematically by optical rays 48 and 50 and arrows 52 and 54, respectively. Projection optics 34 refract rays 48 and 50 and, working at infinite conjugates, project them towards an object (not shown) at a far distance, typically tens or hundreds of meters, with window 36 transmitting rays 48 and 50 at wavelength $\lambda_1$. Similarly, each first beam of light emitted by each of first emitters 26 of emitter array 24 is projected through window 36, thus creating a corresponding pattern of spots in the far field of projection optics 34. The projection angle of each first beam is determined by the focal length of projection optics 34 and by the position of each first emitter 26 in emitter array 24, as is known in the art. For the sake of clarity, only the beam emitted by emitter 46 is illustrated.

Second emitter 28 emits a second beam of light at wavelength $\lambda_2$, with the second beam and its direction of propagation illustrated schematically by optical rays 56 and 58 and arrows 60 and 62, respectively. Projection optics 34 refract and project rays 56 and 58, and would project the rays to a far distance towards the object, but in this case window 36 retro-reflects these rays back to projection optics 34. Projection optics 34 focus the reflected rays 56 and 58 onto detector array 30, as shown by arrows 64 and 66, respectively.

Optoelectronic apparatus 20 can be used in consumer applications in variable ambient temperatures, which cause corresponding fluctuations in the temperature of optoelectronic apparatus 20. These temperature fluctuations, in turn, change the focal length of projection optics 34, especially if the optical elements are fabricated from plastic, where the dimensions, as well as the refractive index, are strongly dependent of the temperature. Due to the change of the focal length, top surface 23 will no longer coincide with focal plane 35. Therefore, rays 48, 50, 56, and 58 will not be projected to a far distance when exiting from projection optics 34, and rays 56 and 58 will not be focused at detector array 30.

Controller 42 processes signals received from detector array 30 in order to monitor the distribution of the light, represented by rays 56 and 58 and arrows 64 and 66, received by the detector array. When controller 42 detects that the received light is not focused to a minimal spot on detector array 30 (or to a spot within a certain tolerance of the minimal size), it drives actuator 40 to change the distance between substrate 22 and projection optics 34 so as to re-focus rays 56 and 58 onto the detector array. This re-focusing brings top surface 23 back to focal plane 35, and rays 48 and 50 are again projected to a far distance by the projection optics. In this way, utilizing the feedback provided by monitoring the distribution of light on detector array 30 and by closing the loop through actuator 40 ensures that the beams emitted by emitters 26 of emitter array 24 are controlled under fluctuating ambient temperatures, and projected into high-quality spots on the object at a far distance. Optionally, when the spot on detector array 30 cannot be refocused to within tolerable limits, controller 42 may take further action, such as issuing an alert or shutting down the emitters.

When substrate 22 is positioned so that its top surface 23 is offset from focal plane 35, projection optics 34 work at finite conjugates, and the reflected second beam on detector array 30 is defocused at the optimal operating point. A change of the focal properties of projection optics 34 due to thermal fluctuations will change the size of the defocused return spot of the second beam on detector array 30. This change in size is detected by controller 42, and used for generating a feedback signal to drive actuator 40 and to control the projected beams, as described above in the context of infinite conjugates.

Fluctuation of the ambient temperature may also affect the projection of rays 48, 50, 56, and 58 due to temperature-induced changes in mechanical framework 38. The feedback mechanism described above works in a similar fashion to control the projection of the rays 48 and 50 in this case.

FIG. 2 is a schematic top view of substrate 22, in accordance with an embodiment of the invention. The figure illustrates the positioning of emitter array 24 of first emitters 26, second emitter 28, and detector array 30 on top surface 23, previously illustrated in a sectional view in FIG. 1. Second emitter 28 emits light from an emitting area 68, with a typical diameter of 10 μm. For projection optics 34 working at infinite conjugates, the light emitted from emitting area 68 is focused into a focal spot 70 on detector array 30. The diameter of focal spot 70 is similar to the diameter of emitting area 68 when apparatus 20 is properly focused, so that top surface 23 coincides with focal plane 35.

The distance between detector array 30 and emitter array 24 may be defined by tilting the angle of window 36 with respect to the optical axis of projection optics 34.

Figure 3:
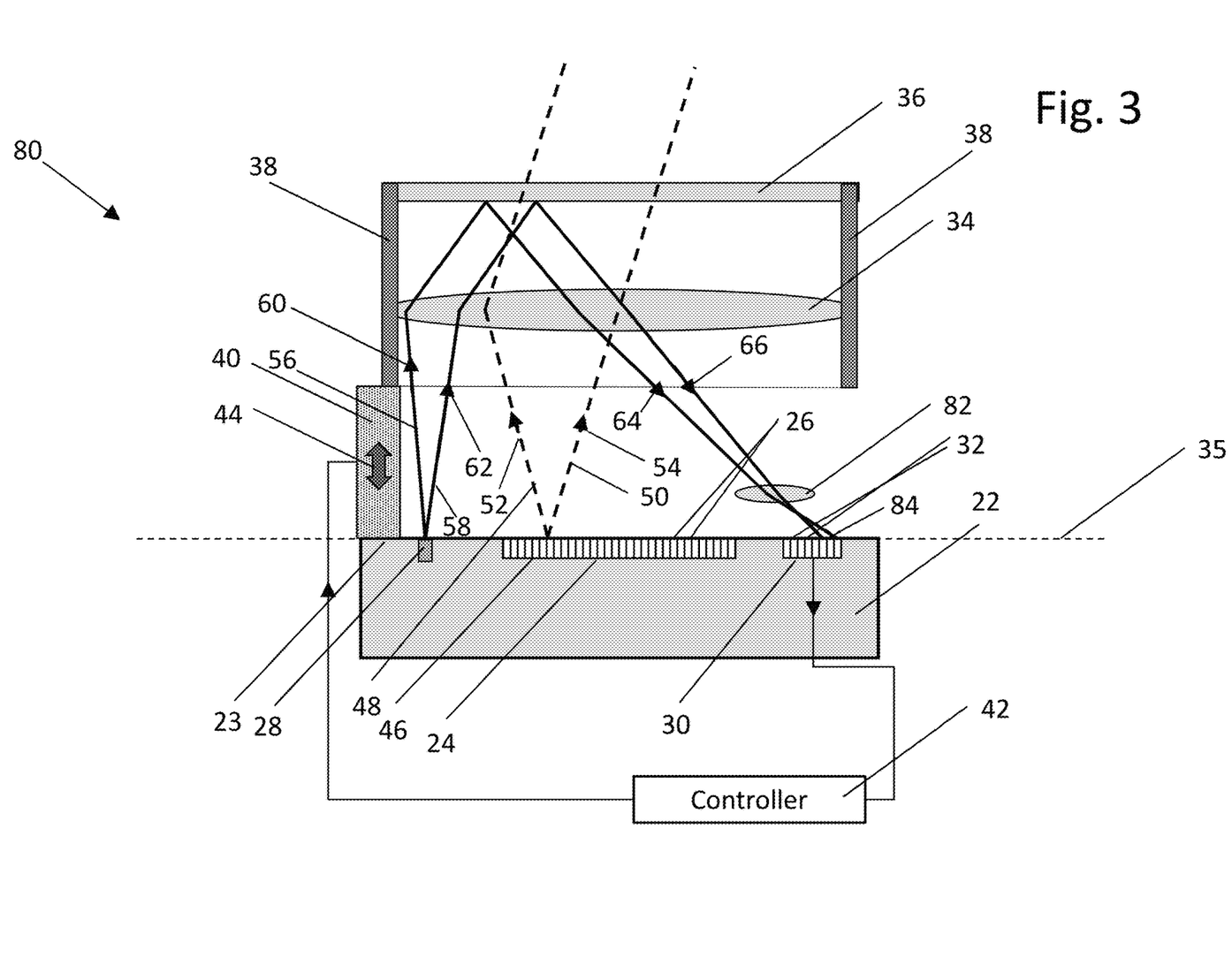
FIGS. 3 and 4 are schematic sectional illustrations of optoelectronic apparatus, in accordance with other embodiment of the invention.

FIG. 3 is a schematic sectional illustration of an optoelectronic apparatus 80, in accordance with another embodiment of the invention. Optoelectronic apparatus 80 is similar to optoelectronic apparatus 20 illustrated in FIG. 1, except for an added astigmatic lens 82. Consequently, the same labels are used in FIG. 3 as in FIG. 1 for similar components.

Astigmatic lens 82 is positioned in the path of the second beam emitted by second emitter 28, in a location chosen so as not to interfere with any of the first beams emitted by first emitters 26. In FIG. 3 astigmatic lens is positioned in proximity to detector array 30. Alternatively, astigmatic lens 82 may be positioned in proximity to second emitter 28. Astigmatic lens 82, in conjunction with projection optics 34, generates a finite focal spot 84 on detector array 30, whose properties can be used in more precisely controlling the focus of apparatus 80.

The focal properties of astigmatic lens 82 are chosen so that when top surface 23 either coincides with focal plane 35 (with projection optics 34 used at infinite conjugates) or is located at a given offset from the focal plane (finite conjugates), focal spot 84 has a given shape, which is stored by controller 42. When top surface 23 deviates from its optimal position with respect to focal plane 35 (for example, due to thermal fluctuations), the shape of focal spot 84 changes. As an example, for infinite conjugates astigmatic lens 82 may be configured so that at the optimal operating point focal spot 84 has a shape of a line (one of the astigmatic foci), and a deviation from the optimal operating point will cause the focal spot to deviate from that shape. As a second example, for finite conjugates astigmatic lens 82 may be configured so that focal spot 84 has a given elliptical shape at the optimal operating point. A deviation from the optimal operating point will change the ellipticity of focal spot 84.

Controller 42 monitors the spatial distribution of focal spot 84 on detector array 30. When controller 42 detects a deviation of the shape of focal spot 84 from the stored, optimal shape, it drives actuator 40 to change the distance between substrate 22 and projection optics 34 so as to return the focal spot to its optimal shape. This re-focusing brings top surface 23 back to its optimal position with respect to focal plane 35, and rays 48 and 50 are again projected by the projection optics to the required distance.

Figure 4:
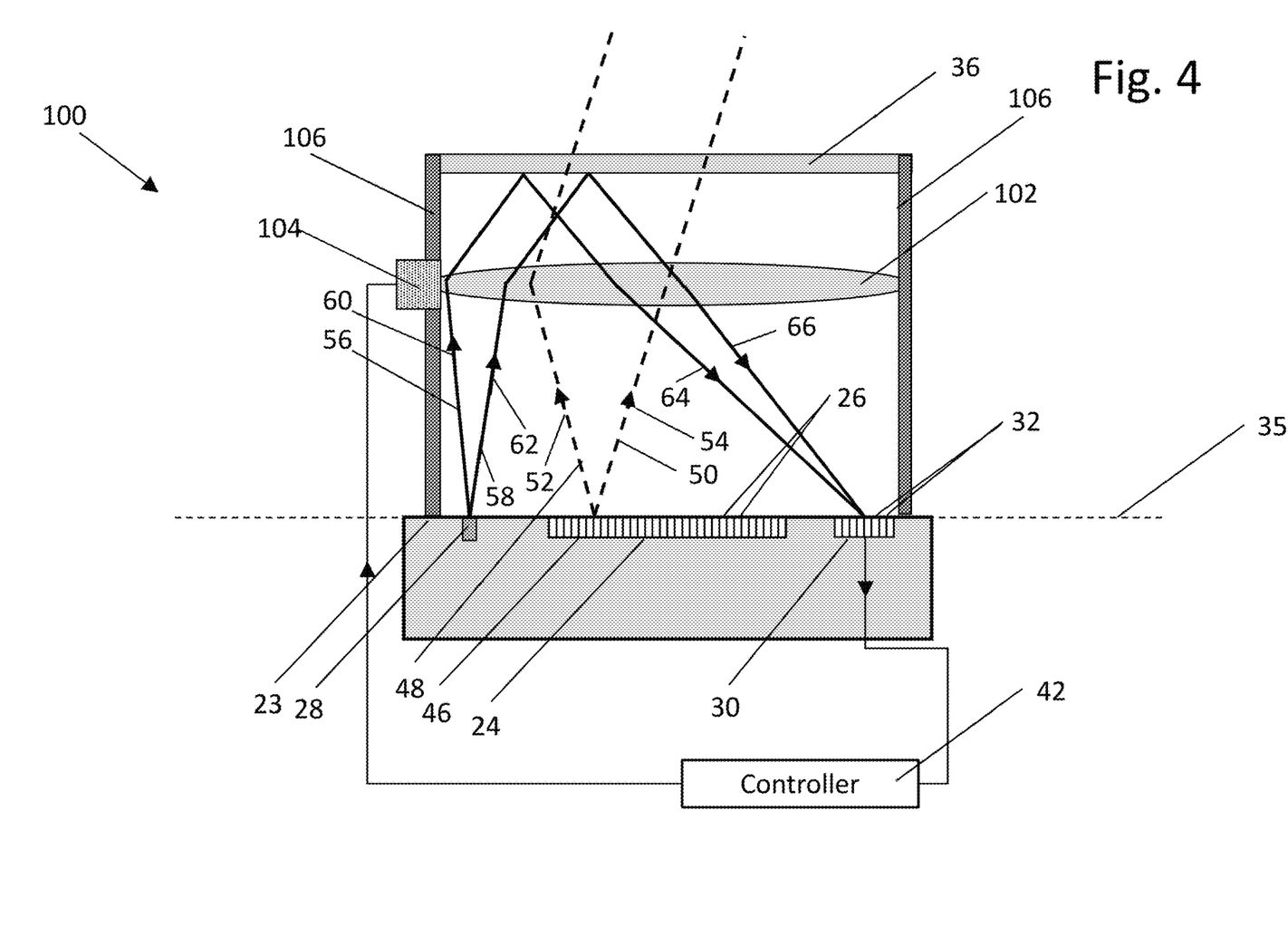

FIG. 4 is a schematic sectional illustration of an optoelectronic apparatus 100, in accordance with yet another embodiment of the invention. Optoelectronic apparatus 100 is similar to optoelectronic apparatus 20 of FIG. 1, except that projection optics 34 have been replaced by projection optics 102, actuator 40 has been replaced by an actuator 104, and mechanical frame 38 has been replaced by a mechanical frame 106. For the components and rays of optoelectronic apparatus 100 that are similar to those of optoelectronic apparatus 20, the same labels are used.

Projection optics 102 comprise at least one optical element 108 having an adjustable focal length, for example a liquid-filled lens. Actuator 104 adjusts the focal length of optical element 108. Projection optics 102, window 36, and substrate 22 are attached to mechanical frame 106.

As in the embodiment of FIG. 1, controller 42 monitors the distribution of the focal spot on detector array 30. In apparatus 100, however, controller 42 utilizes the distribution of the focal spot to drive actuator 104 to adjust the focal length of optical element 108 so as to bring the focal spot on detector array 30 to its optimal distribution. This adjustment returns optoelectronic apparatus 100 to its optimal operating point.

An additional embodiment (not shown in the figures) uses a combination of the astigmatic lens of FIG. 3 with the adjustable focal-length lens of FIG. 4.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Optoelectronic apparatus, comprising:
   a projector, comprising:
      an emitter array, comprising emitters configured to emit respective beams of optical radiation; and
      projection optics having an entrance face and an exit face and configured to receive the beams of the optical radiation through the entrance face and to project the beams through the exit face;
   an optical window, which is positioned adjacent to the exit face of the projection optics and is configured to transmit the optical radiation emitted by the emitter array toward a scene;
   a detector array comprising multiple optical detector elements, which are configured to detect the optical radiation emitted by the projector, including a part of the optical radiation that is reflected back into the apparatus by the optical window; and
   a controller, which is coupled to monitor a spatial distribution of the part of the optical radiation that is reflected by the optical window and sensed by the detector array, so as to detect and adjust for a positional deviation of the apparatus.

2. The apparatus according to claim 1, and comprising an actuator configured to adjust a focal setting of the projection optics, wherein the controller is configured to drive the actuator responsively to the spatial distribution of the optical radiation received and sensed by the detector array.

3. The optoelectronic apparatus according to claim 1, wherein the controller is configured to detect and adjust for a change in a distance between the projection optics and the emitter array.

4. The optoelectronic apparatus according to claim 1, wherein the projection optics comprise at least one optical element with an adjustable focal length, and wherein the controller is configured to detect and adjust for a change in the focal length of the at least one optical element.

5. The optoelectronic apparatus according to claim 1, wherein the optical window is oriented at an angle not normal to an optical axis of the projection optics.

6. The optoelectronic apparatus according to claim 1, wherein the emitters are configured to emit pulses of the optical radiation.

7. The optoelectronic apparatus according to claim 6, wherein the optical detector elements comprise single-photon detectors, and wherein the controller is configured to sense a time of flight of the optical radiation reflected from the scene.

8. The optoelectronic apparatus according to claim 1, wherein the projected beams are configured to form a pattern of spots on the scene.

9. A method for optical sensing, comprising:
   projecting beams of optical radiation from an emitter array of first emitters using projection optics in an optical module, which receive the beams of the optical radiation through an entrance face and project the beams through an exit face;
   positioning an optical window adjacent to the exit face of the projection optics so as to transmit the optical radiation toward a scene;
   detecting the optical radiation emitted by the projector using a detector array comprising multiple optical detector elements, including detecting a part of the optical radiation that is reflected back into the apparatus by the optical window; and
   monitoring a spatial distribution of the optical radiation reflected by the optical window and sensed by the detector array, so as to detect and adjust for a positional deviation in the optical module.

10. The method according to claim 9, and comprising adjusting a focal setting of the projection optics responsively to a distribution of the optical radiation received and sensed by the detector array.

11. The method according to claim 9, wherein monitoring the spatial distribution comprises detecting and adjusting for a change in a distance between the projection optics and the emitter array.

12. The method according to claim 9, wherein the projection optics comprise at least one optical element with an adjustable focal length, and wherein monitoring the spatial distribution comprises detecting and adjusting for a change in the focal length of the at least one optical element.

13. The method according to claim 9, wherein positioning the optical window comprises orienting the optical window at an angle not normal to an optical axis of the projection optics.

14. The method according to claim 9, wherein projecting the beams comprises emitting pulses of the optical radiation toward the scene.

15. The method according to claim 14, wherein the optical detector elements comprise single-photon detectors, and wherein the method comprises sensing a time of flight of the optical radiation reflected from the scene.

16. The method according to claim 9, wherein projecting the beams comprises forming a pattern of spots on the scene.

* * * * *

UNITED STATES PATENT AND TRADEMARK OFFICE
CERTIFICATE OF CORRECTION

PATENT NO. : 11,555,982 B1
APPLICATION NO. : 17/121792
DATED : January 17, 2023
INVENTOR(S) : Neil McKinnon It is certified that error appears in the above-identified patent and that said Letters Patent is hereby corrected as shown below:

On the Title Page

Item (60) should read:
Continuation of application No. 16/180,048, filed on Nov. 05, 2018, now Pat. No. 10,908,383
Provisional application No. 62/588,358, filed on Nov. 19, 2017

Signed and Sealed this
Ninth Day of April, 2024

Katherine Kelly Vidal
*Director of the United States Patent and Trademark Office*